US010062388B2

(12) United States Patent
Ady et al.

(10) Patent No.: US 10,062,388 B2
(45) Date of Patent: Aug. 28, 2018

(54) ACOUSTIC AND SURFACE VIBRATION AUTHENTICATION

(71) Applicant: Motorola Mobility LLC, Chicago, IL (US)

(72) Inventors: Roger W Ady, Chicago, IL (US); Robert Zurek, Antioch, IL (US)

(73) Assignee: Motorola Mobility LLC, Chicago, IL (US)

( * ) Notice: Subject to any disclaimer, the term of this patent is extended or adjusted under 35 U.S.C. 154(b) by 171 days.

(21) Appl. No.: 14/919,980

(22) Filed: Oct. 22, 2015

(65) Prior Publication Data

US 2017/0116995 A1 Apr. 27, 2017

(51) Int. Cl.
| | | |
|---|---|---|
| G10L 19/14 | (2006.01) | |
| G10L 17/24 | (2013.01) | |
| H04W 12/06 | (2009.01) | |
| G10L 17/00 | (2013.01) | |
| G10L 17/02 | (2013.01) | |
| H04R 1/08 | (2006.01) | |
| H04R 1/46 | (2006.01) | |
| G06F 21/32 | (2013.01) | |
| H04L 29/06 | (2006.01) | |
| H04R 3/00 | (2006.01) | |

(52) U.S. Cl.
CPC .............. *G10L 17/24* (2013.01); *G06F 21/32* (2013.01); *G10L 17/005* (2013.01); *G10L 17/02* (2013.01); *H04L 63/0861* (2013.01); *H04R 1/08* (2013.01); *H04R 1/46* (2013.01); *H04W 12/06* (2013.01); *H04R 3/005* (2013.01); *H04R 2499/11* (2013.01)

(58) Field of Classification Search
CPC ....... G10L 17/00; G10L 17/02; G10L 17/005; G10L 25/00
USPC .......................................... 704/205
See application file for complete search history.

(56) References Cited

U.S. PATENT DOCUMENTS

| | | | | |
|---|---|---|---|---|
| 7,629,897 | B2 * | 12/2009 | Koljonen .......... | H04M 1/72527 340/4.13 |
| 7,676,372 | B1 * | 3/2010 | Oba .................... | G09B 21/009 434/169 |
| 9,263,062 | B2 * | 2/2016 | Jing .................... | G10L 21/0208 |
| 2004/0080411 | A1 * | 4/2004 | Renfro ................ | G10L 17/00 340/539.1 |
| 2004/0236573 | A1 * | 11/2004 | Sapeluk .............. | G10L 17/02 704/224 |
| 2005/0093970 | A1 * | 5/2005 | Abe .................... | H04N 7/15 348/14.05 |
| 2005/0096906 | A1 * | 5/2005 | Barzilay .............. | G06Q 30/06 704/249 |
| 2007/0185718 | A1 * | 8/2007 | Di Mambro ........ | G06F 21/32 704/273 |

(Continued)

*Primary Examiner* — Jakieda Jackson
(74) *Attorney, Agent, or Firm* — Miller, Matthias & Hull LLP

(57) ABSTRACT

Systems and methods for authorizing a user of a portable communications device entail sampling a user utterance via both an air mic (audio mic) and a conduction mic (surface mic or bone conduction mic). The difference between these signals is unique to each user since the tissues of each user will differ with respect to audio conduction. This difference may be characterized via a transform including magnitude, phase and time delay components. If the transform for a prospective user matches a stored transform for an authorized user, then the prospective user may be granted access.

17 Claims, 6 Drawing Sheets

(56) References Cited

U.S. PATENT DOCUMENTS

| | | | | |
|---|---|---|---|---|
| 2007/0291953 | A1* | 12/2007 | Ngia | G10L 15/02 |
| | | | | 381/71.6 |
| 2011/0221671 | A1* | 9/2011 | King, III | G02B 27/017 |
| | | | | 345/156 |
| 2011/0261983 | A1* | 10/2011 | Claussen | H04R 25/505 |
| | | | | 381/317 |
| 2013/0225128 | A1* | 8/2013 | Gomar | H04W 12/06 |
| | | | | 455/411 |
| 2014/0324591 | A1* | 10/2014 | Kim | H04W 4/043 |
| | | | | 705/14.58 |
| 2014/0358535 | A1* | 12/2014 | Lee | G10L 15/22 |
| | | | | 704/233 |
| 2015/0210287 | A1* | 7/2015 | Penilla | B60W 40/08 |
| | | | | 701/49 |
| 2015/0281433 | A1* | 10/2015 | Gainsboro | H04M 3/2281 |
| | | | | 379/88.01 |
| 2015/0287422 | A1* | 10/2015 | Short | G01S 7/288 |
| | | | | 704/205 |
| 2016/0057553 | A1* | 2/2016 | Ryu | H04M 1/6033 |
| | | | | 340/4.41 |

* cited by examiner

ACOUSTIC AND SURFACE VIBRATION AUTHENTICATION

TECHNICAL FIELD

The present disclosure is related generally to security for portable communication devices, and, more particularly, to a system and method for authenticating an authorized user via acoustic and surface wave analysis.

BACKGROUND

Users of portable communication devices such as mobile phones often keep sensitive personal and financial information on their phones as a matter of convenience. However, if the phone is then accessed by an unauthorized individual, the user's private information may be comprised, at great personal or financial cost to the user. As such, it is known to password protect mobile phones and the like.

Indeed, manually entered PIN codes, fingerprint readers, and iris readers are recognized as robust authentication and security systems. However, these systems can be inconvenient to the user since they cannot be used hands-free or unobtrusively. Moreover, while audible PIN codes or passphrases are convenient, these are not robustly secure since a nearby person may be able to overhear or record the utterance and later access the device by repeating or playing back the utterance. Although the "trusted device" option in Google Android and other mobile devices operating systems can make authentication unnecessary if the primary and "trusted" device remain together, the loss of both of these devices in the same episode is not uncommon, and even an unattended device can be surreptitiously accessed when the trusted entity is within Bluetooth range but not within the user's sight.

The present disclosure is directed to a system that can eliminate or reduce some of the shortcomings noted above. However, such benefits are not limitations on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this Background section as admitted or assumed prior art. Moreover, the identification herein of desirable future courses of action reflects the inventors' own observations and ideas unless otherwise noted, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
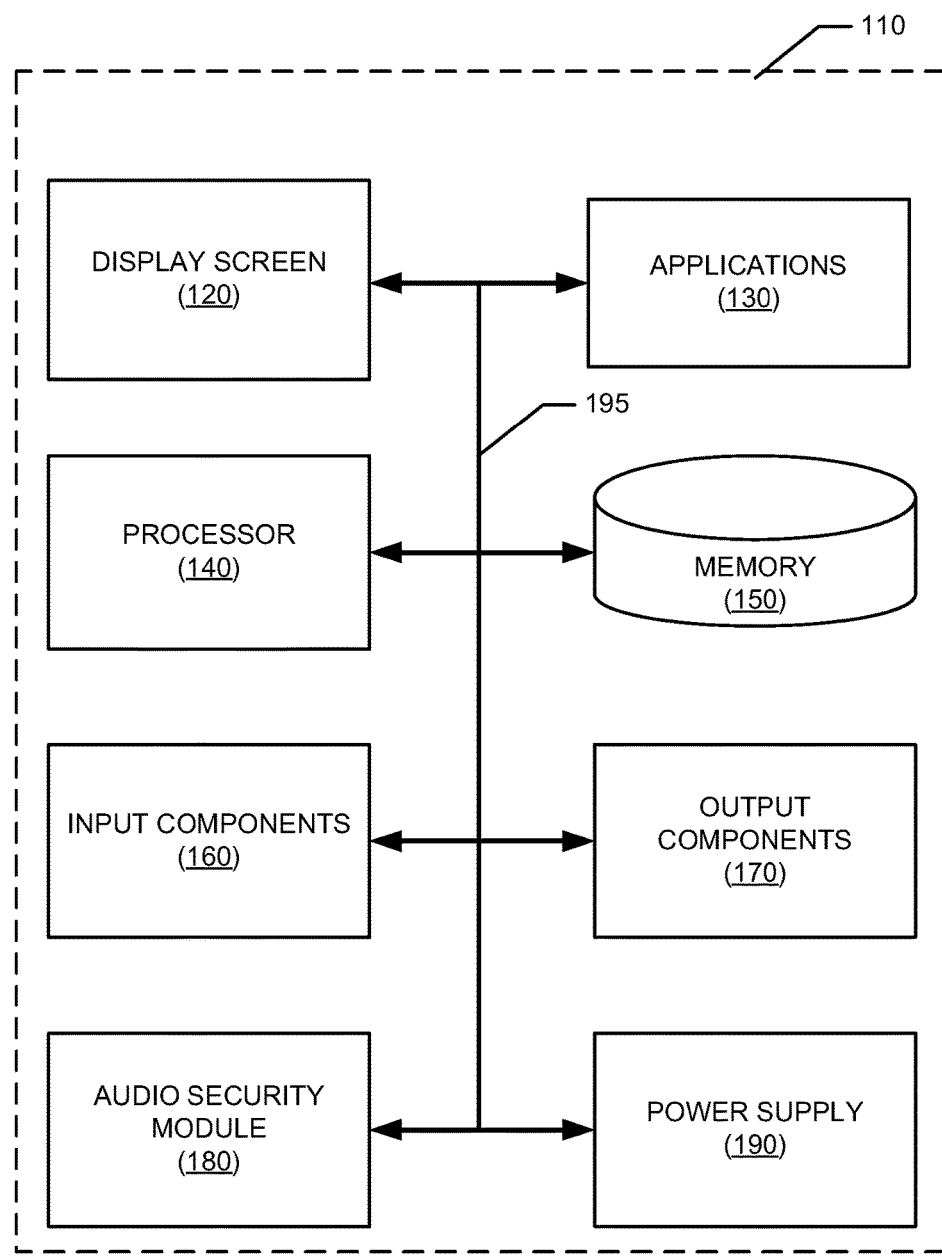
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, currently used authentication systems for portable devices are either cumbersome or non-robust; for example, with respect to voice authentication, it is possible for an unscrupulous person to overhear and/or record the utterance used for verification and to later repeat or play back the utterance to gain access to the device.

In an embodiment of the disclosed principles, a user is able to be authenticated via a spoken utterance that is received by both an acoustic microphone and a surface vibration microphone (also known as a "bone conduction" microphone). Both signals are analyzed to verify that the utterance was made by an authorized user. The surface microphone can include a microphone element, an accelerometer element, a laser surface transducer that detects displacement or velocity, or any other known method of surface vibration measurement.

In particular, the acoustic microphone response received during an authentication attempt is compared against a recorded, stored and validated acoustic microphone response taken at setup and calibration. The "validation" noted here refers to an iterative process used to ensure the utterance is sufficiency complex and unique to serve as an identifier for the intended user.

Similarly, the surface vibration response received concurrently by the surface vibration microphone is either compared against a recorded, stored and validated surface microphone response collected during setup and calibration or analyzed against the incoming acoustic response to generate a transfer function between them that can then be compared against the transfer function generated either during setup and calibration or through other recorded vocal activity performed after the speaker had been authenticated as the authorized user.

The transfer function, or transform, between an acoustic and surface vibration microphone is substantially fixed and unique for different users since it is almost entirely a function of the geometry, density, and size of the various tissues and cavities of the user's head and neck. To reduce the variability of the microphone responses and hence the variability in the resulting transfer function, the location of the two (or more) microphones relative to the user and relative to each other are fixed in an embodiment. This will generally be the case if the microphones are located on the same device, e.g., an in-ear headset, an over-the-head headset, eyeglasses, or a properly designed handset device.

The surface vibration microphone in those cases is positioned to contact the surface of the ear canal (in-ear headset), bones around the ear (over-the-head headset), the bridge of the nose (glasses-like headset), or the cheek or ear bones (handset with a surface vibration microphone that contacts facial bones when in use). The acoustic microphone is located anywhere open to the free air space around the user's head. The security check can then be made at the wearable device or at the handset.

In either case, a failed authorization check may result in revocation of the "trusted device" status of the peripheral on the head if such a peripheral is used and configured in that manner. This may then result in a security challenge to the user on the host device.

Each user's transfer function can be calculated through an analog or digital division algorithm, and such transfer functions are largely independent of the actual utterance spoken. The transfer function is then refined and statistically bolstered by periodic sampling of the acoustic and surface waves after the user has been authorized, such as when the device is unlocked in this manner and a voice command or text input immediately follows. Conversely, the transform may be randomly sampled to re-validate that the authorized user is still the one using the device, and a security challenge may be triggered if this validation fails.

This feature serves as a theft deterrent on the "trusted device" peripheral itself in addition to the host device. For example, if an in-ear headset were to be stolen, the headset in accordance with an embodiment of the disclosed principles would detect the change in the user's transform and would challenge the user with the security phase. If that check failed, then the device may be disabled from further use. The device would also be disabled as a "trusted device" to the host, which would in turn lock out the host device as well.

With respect to the transfer function, this function may be a frequency domain transform, or time domain transform, or a combination of both. Not only does the user's head change the frequency response of the spoken utterance, but the human tissues exhibit acoustic dispersion, which presents itself in frequency-dependent delay of the sound propagating through the tissue. In other words, the signal picked up by the surface microphone exhibits frequency dependant delay relative to the signal picked up at the acoustic mic. The characterization of this delay can be made via a frequency banded cross-correlation, or spectral cross-correlation. This allows not only magnitude and phase characterization of the transfer function, but time delay characterization as well.

As noted, the system calculates the transfer function and checks it against the authorized user's stored transfer function in an embodiment. However, as an additional or alternative embodiment, the device may simply perform speech and speaker identification on the acoustic signal and the surface vibration signal in parallel. The second voice recognition/speaker recognition process using the surface vibration pickup to augment the acoustic voice recognition/speaker recognition process makes authentication more secure than the single process alone.

As noted above, validation may occur at the host device (e.g., mobile phone) rather than at the peripheral (e.g., earpiece). This requires the peripheral to send the relevant data to the host device. In an embodiment, an additional security precaution is implemented to prevent unauthorized persons from sniffing the Bluetooth link and receiving the entire acoustic-to-surface vibration transfer function. In particular, an algorithm uses a pseudo random set of inputs where the response as determined by the algorithm is dependent upon the pseudo random set of inputs. These are very unlikely to be anticipated and can be established so as to be unlikely to ever repeat.

The pseudo random set of inputs may be randomized frequencies sent from the portable device to, for instance, a head-worn device. The head worn device then only calculates and shares with the portable communications device transfer functions for those discrete frequencies to be checked and validated. Consequently any previously intercepted valid responses would likely be invalid and/or of limited assistance relative to a determination of future responses. As a result, an unauthorized user would need to be able to decode the algorithm and intercept the future pseudo-random inputs before a valid future response could be generated.

Still further, if the algorithm incorporates the variability associated with a user's biometric information, an unauthorized user would need access to the individual as part of the decomposition of the algorithm. Biometric data is complex in general, and so many types of biometric data do not readily decode based upon casual observance. As such, any attempt to decode would be fairly intrusive. Consequently, the ability to use biometric information as part of an algorithm for use as a security mechanism makes an unauthorized user's attempts to decode the algorithm obvious.

Due to the random nature and sparse spacing of the frequencies of the requested transfer function, communication would need to be intercepted over a very long period of time to model the full transfer function contained in the trusted device. Further, the entire transfer function at each of the communicated frequencies need not be communicated between devices, but rather a single value for each requested frequency could be shared, further reducing the likelihood of duplicating the full transfer function. For example, the device may request the phase transfer function in degrees or radians for frequency A, while requesting the amplitude of the transfer function for frequency B, and the time delay for frequency C.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as speech and text input facilities including audio microphones and surface microphones, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Figure 2:
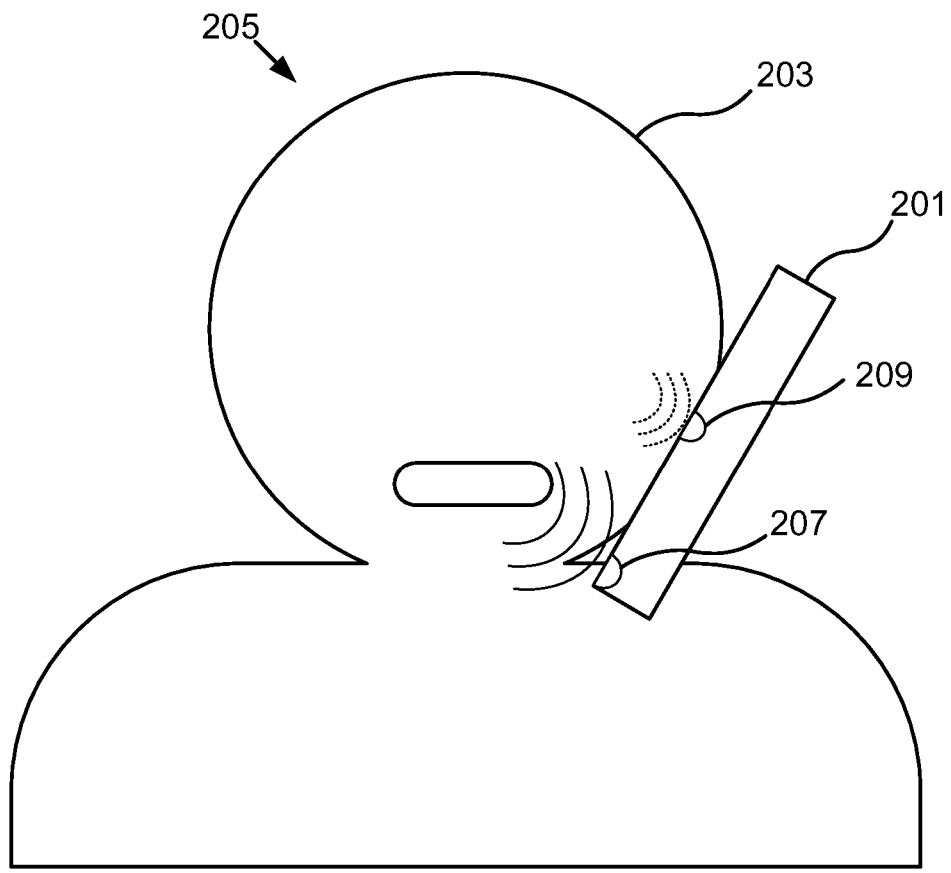
FIG. 2 is a simplified schematic showing a relationship of elements of the described system in an embodiment wherein the handset includes both the audio microphone and the surface microphone.

As noted above, the described system allows improved user authentication with respect to a device such as the device described by reference to FIG. 1. Having understood the basic system structure, and turning to FIG. 2, a simplified schematic is shown to identify the relationship of elements of the described system in an embodiment wherein the handset includes both the audio microphone and the surface mic.

As can be seen, the handset 201 is held in proximity to the head 203 of the authenticating user 205 during authentication. As the user 205 speaks, the audio microphone 207 generates a response based on the audible sound of the utterance. Simultaneously, within the tolerance of any lag introduced by tissues, the surface microphone 209 generates a response based on the audio vibration travelling through the user's head 203 and neck.

Figure 3:
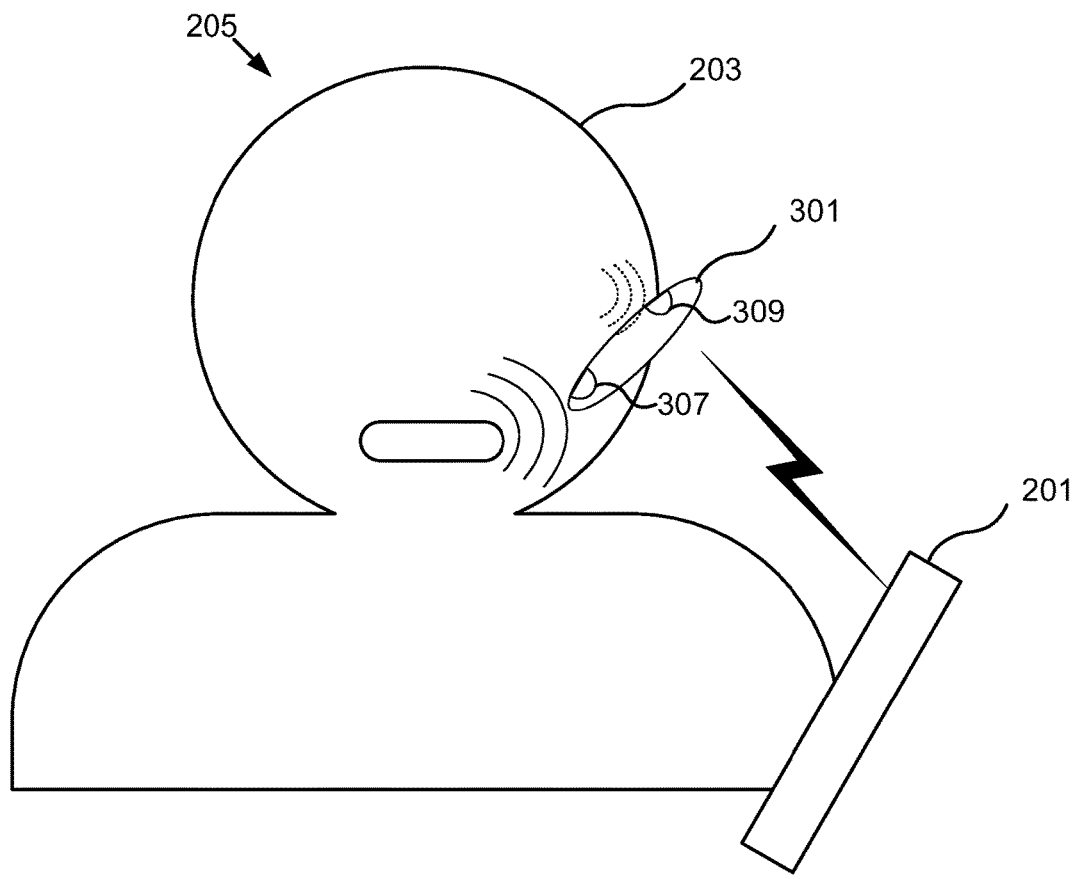
FIG. 3 is a simplified schematic showing a relationship of elements of the described system in an embodiment wherein a wearable device is used to collect the audio and surface signals.

Similarly, FIG. 3 shows a simplified schematic for a scenario wherein a wearable device 301 is used to collect the audio and surface signals. The wearable device 301 includes an audio microphone 307 which generates a response based on the audible sound of the utterance, as well as a surface microphone 309 which generates a response based on the audio vibration travelling through the user's head 203 and neck. The wearable device 301 may be in wireless communication with the host device 201, and as noted above, the audio processing for authentication may take place at the wearable device 301 or at the host device 201.

In either case, the collected audio signals will include an original audio signal gathered at the audio microphone and a transformed audio signal gathered at the surface mic. The transformed audio signal represents the original audio signal after any alterations and delays resulting from travelling through the bone, tissue and cavities in the user's body.

Figure 4:
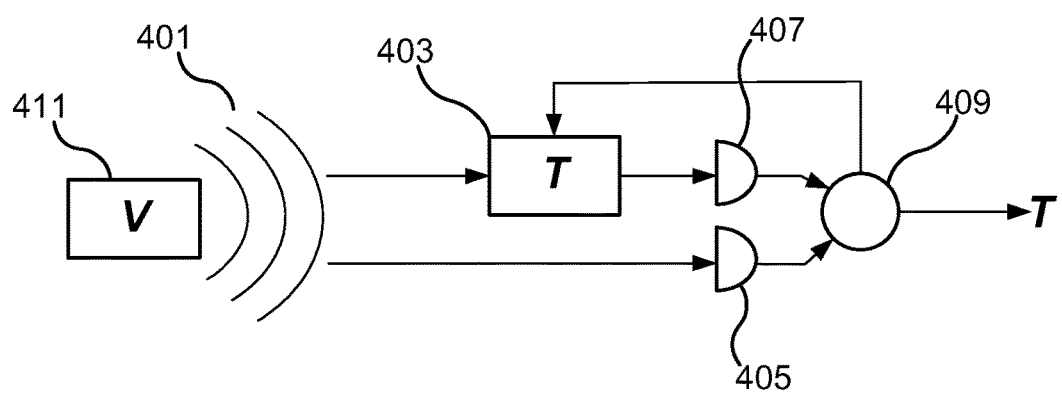
FIG. 4 is a circuit model illustration of the paths of audio signals received at the audio and surface microphones.

FIG. 4 illustrates schematically a model of the audio signals received at the two mics. As can be seen, the user's vocal tract V (411) produces an audio signal 401, which reflects the combined effects of the user's vocal chords (for voiced sound) and the throat and nose chambers. The vocal chords do not play a role in the utterance of consonants and whispered sounds, but the user's throat and nose chambers affect all utterances.

The audio signal 401 produced by the user's vocal tract V (411) is received at a first microphone 405 (the audio mic) after travelling through the air between the user's mouth and the first microphone 405. The audio signal 401 is also received at a second microphone 407 (surface mic) after travelling through the bone, tissue and cavities between the user's vocal tract and the second microphone 407. The modifications to the audio signal 401 created by its passage through these materials is reflected by the transform T (403).

Because of this transform T (403), the audio signal received at the second microphone 407 differs in some regards from the audio signal received at the first microphone 405. In particular, the speed of propagation of sound through body tissues may be higher than the speed of propagation of sound through air. Moreover, the passage of sound through body tissues introduces a frequency-dependent delay into the signal. These changes are unique to each user based on the user's unique tissue composition and configuration.

The signals received at the first microphone 405 and second microphone 407 are correlated at an analyzer 409 to identify the specific differences introduced by the transform T (403). In this way, the transform T, if not previously know, can be identified. Similarly, when an authorized user transform is known, it can be applied during future utterances to a received audio signal from the first microphone 405 to determine what audio signal should be expected at the second microphone 407. In general terms, if the signal actually received at the second microphone 407 differs substantially from the expected signal, the device can infer that the current utterance did not come from the previously authorized user whose transform is stored.

Alternatively, as noted above, the transform of the signal actually received at the second microphone 407 may be calculated based on the signal received at the first microphone 405, and that transform can then be directly compared with the stored transform. These two approaches to the authentication step are shown in process flow form in FIGS. 5 and 6 respectively.

Figure 5:
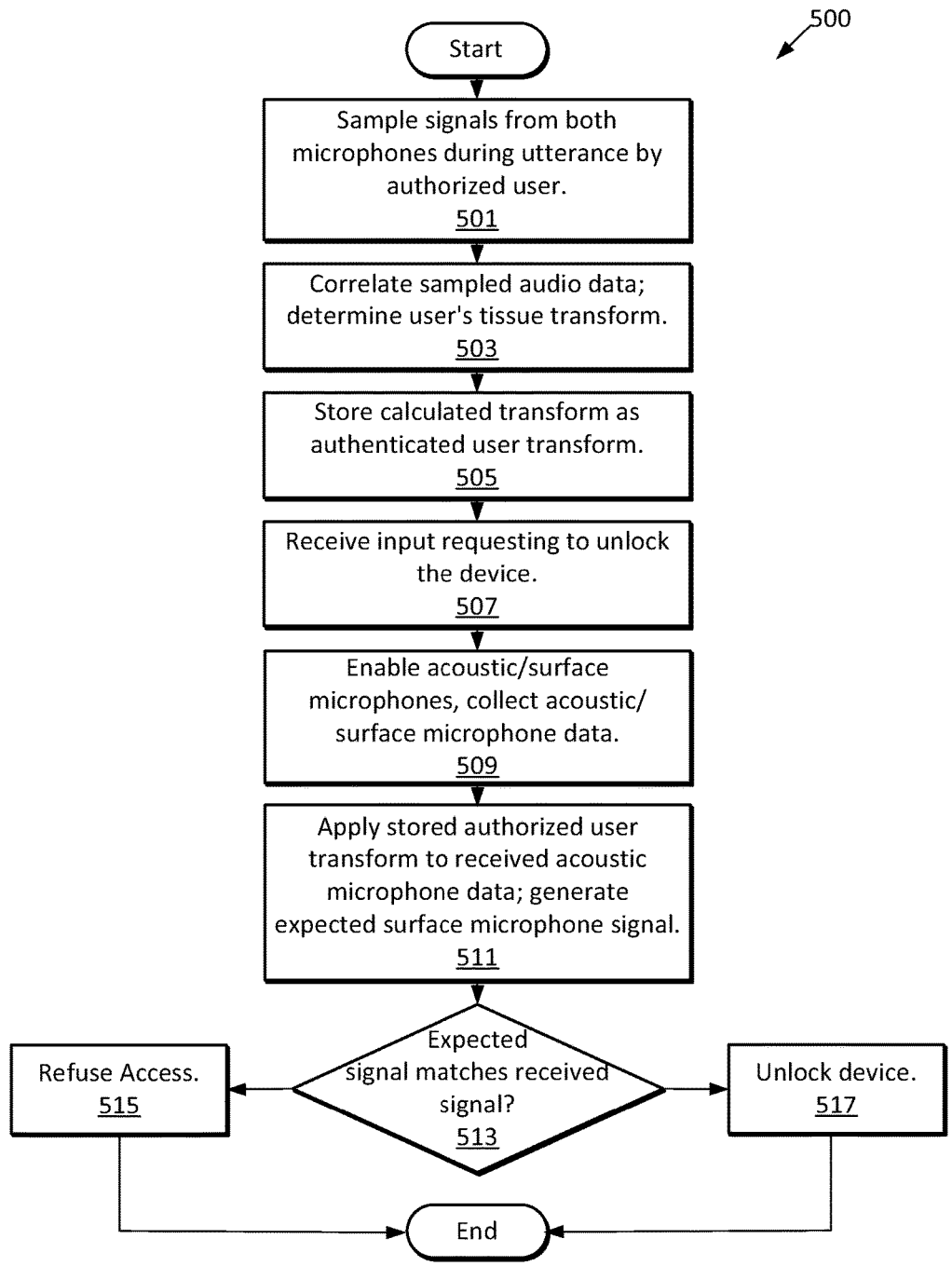
FIG. 5 is a flow chart illustrating a process to authenticate a user of a portable communication device in accordance with an embodiment of the disclosed principles.

Referring more specifically to FIG. 5, this figure shows process steps taken in an embodiment to authenticate a user of a portable communication device such as a mobile phone. The device includes both a direct voice microphone and a surface mic, such that when the device is held as it is used, the direct voice microphone is able to detect a voice signal from the user through the air and the surface microphone is able to detect an audio signal related to the voice signal but conducted through the user's tissues from the user's vocal tract to the location of the surface microphone on the user's skin.

At stages 501 through 505 of the illustrated process 500, the device stores authentication information usable to identify an authorized user. Thus at stage 501, the device samples signals from both microphones during an utterance by the authorized user. The utterance may be a predetermined word or phrase or may be selected by the user. The device correlates the sampled audio data from the different microphones at stage 503 to determine a transform of the user's tissue that affects the signal gathered at the surface mic, e.g., the transform that must be applied to the signal gathered at the first microphone to result in the signal gathered at the second mic.

Each user's transform can be calculated through an analog or digital division algorithm, and such transfer functions are largely independent of the actual utterance spoken. It will be appreciated that the transform may be refined and statistically bolstered by periodic sampling of the acoustic and surface waves after the user has been authorized, such as when the device is unlocked in this manner and a voice command or text input immediately follows. Conversely, the transform may be randomly sampled to re-validate that the authorized user is still the one using the device. The transform may be a frequency domain transform, or time domain transform, or a combination of both. As noted above, the user's tissues change the frequency response of the spoken utterance and also introduce acoustic dispersion, which presents itself in frequency-dependent delay of the sound propagating through the tissue. The characterization of this delay can be made via a frequency banded cross-correlation, or spectral cross-correlation. This allows not only magnitude and phase characterization of the transfer function, but time delay characterization as well.

At stage 505, the device stores the calculated transform as the authenticated user's transform. Although not shown in the process 500, the device may periodically sample the authorized user's utterances during use of the device to refine the transform, and optionally also to detect use by an unauthorized user subsequent to proper authorization by the authorized user.

The following stages of the process 500, i.e., stages 507 through 517 entail authorization or denial of a user whose identity is not known a priori. These stages assume that the device is initially locked, that is, that the device as a whole is locked or that the device itself is unlocked but that certain applications or utilities are locked.

At stage 507 of the process 500, the device receives an input indicating a request to unlock the device. The device enables the acoustic and surface microphones in response at stage 509, and collects acoustic and surface microphone data for a user utterance at stage 509.

At stage 511 the stored authorized user transform is applied to the acoustic microphone data to generate an expected surface microphone signal. The expected surface microphone signal is compared to the actually received surface microphone signal at stage 513, and the process 500 refuses authorization at stage 515 if there are differences greater than a predetermined tolerance between the compared signals. If however, the compared signals match within the predetermined tolerance at stage 513, then the device unlocks at stage 517.

As noted above, instead of the process 500 shown in FIG. 5, the transform of the signal received at the second microphone 407 may be calculated based on the signal received at the first microphone 405, and that transform can then be directly compared with the stored transform. This alternative technique 600 is described in the flow chart of FIG. 6.

Figure 6:
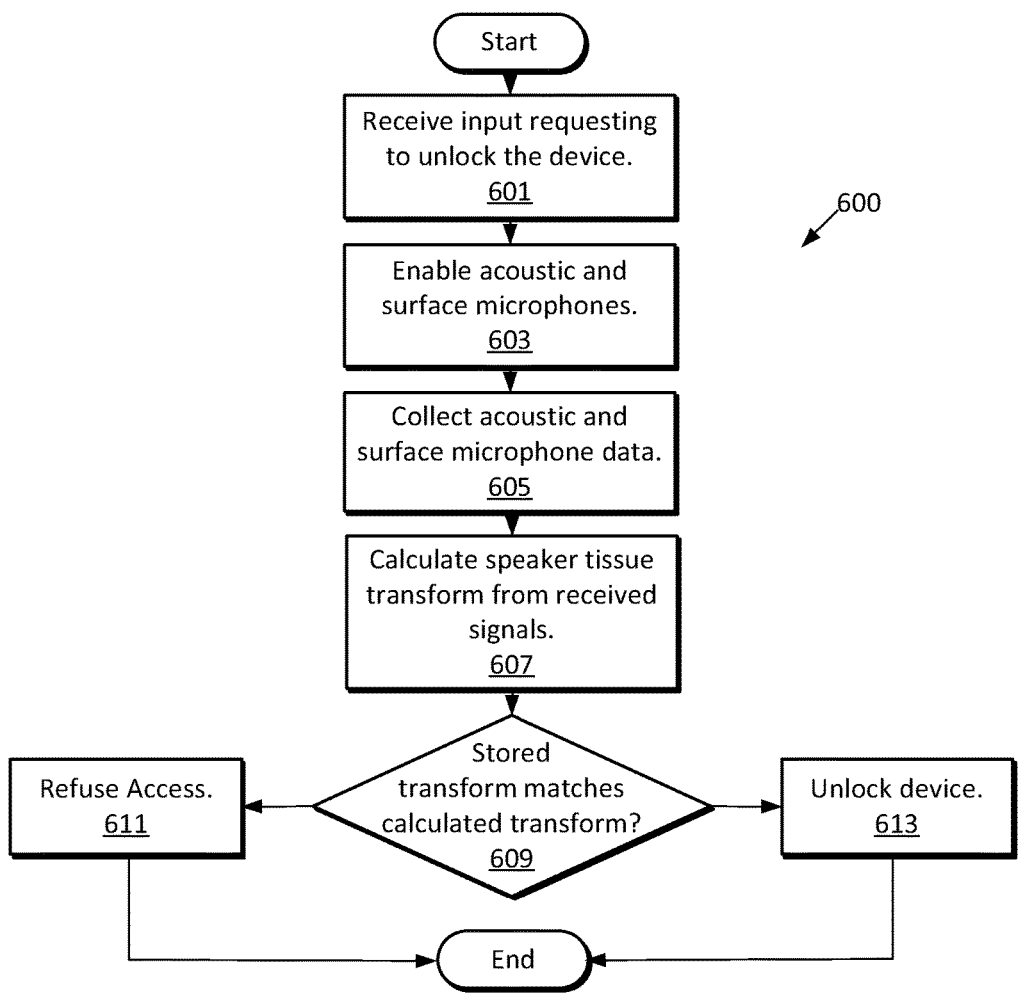
FIG. 6 is a flow chart illustrating a process to authenticate a user of a portable communication device in accordance with an alternative embodiment of the disclosed principles.

The process 600 shown in FIG. 6 assumes that an authorized user utterance has been sampled and an appropriate transform stored, as in stages 501 through 505 of process 500. At stage 601 of process 600, the device receives an input indicating a request to unlock the device. The device enables the acoustic and surface microphones in response at stage 603, and collects acoustic and surface microphone data for a user utterance at stage 605. As noted above, the utterance may be predetermined or may be chosen by the user.

At stage 607 the surface microphone data is processed in view of the acoustic microphone data to generate a user transform. The user transform is compared to the stored authenticated user transform at stage 609, and the device refuses authorization at stage 611 if there are differences greater than a predetermined tolerance between the compared transforms. If, however, the compared transforms match within the predetermined tolerance, then the device unlocks at stage 613.

It will be appreciated that actions or tasks executed by the mobile device are executed by the processor of the mobile device. The processor is configured to take the indicated action by computer-executable instructions stored on a non-transitory computer-readable medium such as a magnetic or optical disc, flash drive, read only memory, random access memory and so on.

As noted above, an utterance of a user may need to be validated, i.e., to meet certain minimum requirements, before it can serve as the basis for a comparison of actual and expected data or a comparison of transforms. The validation may be an iterative process that ensures that the utterance is sufficiency complex and unique to serve as an identifier for the intended user. The qualifier or validating criteria may be a statistical confidence level over a certain predetermined threshold for example.

While the foregoing describes an authentication step wherein the user supplies an utterance, this activity may occur either during setup or through other recorded vocal activity performed after the speaker is authenticated via another mechanism as the authorized user.

As noted above, in order to reduce the variability of the microphone responses and hence the variability in the resulting transform function, the location of the two or more microphones are substantially fixed relative to the user and relative to each other in an embodiment. This will generally be the case if the microphones are located on the same device, e.g., an in-ear headset, an over-the-head headset, eyeglasses, or a properly designed handset device. In these cases the surface vibration microphone is positioned to contact the surface of the ear canal (in-ear headset), bones around the ear (over-the-head headset), the bridge of the nose (glasses-like headset), or the cheek or ear cartilage/bones (handset with a surface vibration microphone that contacts facial bones when in use). The acoustic microphone is located anywhere open to the free air space around the user's head. The security check can then be made at the wearable device or at the handset.

While peripherals such as headsets and earpieces generally exist as trusted peripherals, a failed authorization check may result in revocation of the "trusted device" status of the peripheral, resulting in a security challenge to the user on the host device rather than the peripheral. This feature serves as a theft deterrent on the "trusted device" peripheral itself in addition to the host device. For example, if an in-ear headset were to be stolen, the headset in accordance with an embodiment of the disclosed principles would detect the change in the user's transform and would challenge the user with the security phase. If that check failed, then the device may be disabled from further use. The device would also be disabled as a "trusted device" to the host, which would in turn lock out the host device as well.

In addition to the transfer function and checks noted above, the device may also perform speech and speaker identification on the acoustic signal and the surface vibration signal in parallel. The second voice recognition/speaker recognition process using the surface vibration pickup to augment the acoustic voice recognition/speaker recognition process makes authentication more secure than the single process alone. In this embodiment separate user-voice models would be created for the air borne speech and the tissue borne speech. Each instance of the voice recognition/speaker recognition would use the appropriate voice model for that pickup.

As noted above, validation may occur at the host device (e.g., mobile phone) rather than at the peripheral (e.g., earpiece). In this embodiment, the peripheral device sends the relevant data to the host device, be that the raw audio data, processed audio data, or an authorization indication. In a further embodiment, an additional security precaution is implemented to prevent unauthorized persons from sniffing the Bluetooth link and receiving the entire acoustic-to-surface vibration transfer function. In particular, an algorithm is employed using a pseudo random set of inputs where the response of the algorithm is dependent upon the pseudo random set of inputs. Since these are very unlikely to be anticipated, this provides an additional layer of security.

The pseudo random set of inputs may be randomized frequencies sent from the portable device to, for instance, a head-worn device. The head worn device then only calculates and shares with the portable communications device transfer functions for those discrete frequencies to be checked and validated. Consequently any previously intercepted valid responses would likely be invalid and/or of limited assistance relative to a determination of future responses. As a result, an unauthorized user would need to be able to decode the algorithm and intercept the future pseudo-random inputs before a valid future response could be generated.

Due to the random nature and sparse spacing of the frequencies of the requested transfer function, communication would need to be intercepted over a very long period of time to model the full transfer function contained in the trusted device. Further, the entire transfer function at each of the communicated frequencies need not be communicated between devices, but rather a single value for each requested frequency could be shared, further reducing the likelihood of duplicating the full transfer function. For example, the device may request the phase transfer function in degrees or radians for frequency A, while requesting the amplitude of the transfer function for frequency B, and the time delay for frequency C.

It will be appreciated that various systems and processes for facilitating user authentication for a portable communication device have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
    an audio microphone associated with the portable electronic communication device and configured and located to produce a first signal corresponding to a user's voice when the portable electronic communication device is in use by the user;
    a surface microphone associated with the portable electronic communication device and configured and located to produce a second signal corresponding to audio vibrations of the user's tissue from the user's voice when the portable electronic communication device is in use by the user; and
    a processor configured to generate a transfer function relating the first signal to the second signal and to identify the user as authorized or unauthorized based on the transfer function.

2. The portable electronic communication device in accordance with claim 1, wherein the processor is further configured to generate the transfer function by applying one of an analog division algorithm and a digital division algorithm.

3. The portable electronic communication device in accordance with claim 1, wherein the transfer function is a frequency domain transform.

4. The portable electronic communication device in accordance with claim 1, wherein the transfer function is a time domain transform.

5. The portable electronic communication device in accordance with claim 1, wherein the transfer function is a combination of a frequency domain transform and a time domain transform.

6. The portable electronic communication device in accordance with claim 1, wherein when the device is unlocked, the processor is further configured to lock the device upon identifying the user as unauthorized.

7. The portable electronic communication device in accordance with claim 1, wherein the audio microphone and the surface microphone are installed in a wearable device separate from the portable electronic communication device.

8. The portable electronic communication device in accordance with claim 7, wherein the audio microphone and the surface microphone are installed in an in-ear headset and the surface microphone is positioned to contact a surface of the user's ear canal when in use.

9. The portable electronic communication device in accordance with claim 7, wherein the audio microphone and the surface microphone are installed in an over-the-head headset and the surface microphone is positioned to overlie one or more bones adjacent the user's ear when in use.

10. The portable electronic communication device in accordance with claim 7, wherein the audio microphone and the surface microphone are installed in a pair of eyeglasses and the surface microphone is positioned to contact the bridge of the user's nose when in use.

11. The portable electronic communication device in accordance with claim 7, wherein the processor is further configured to receive authorization data wirelessly from the wearable device.

12. The portable electronic communication device in accordance with claim 1, wherein the audio microphone and the surface microphone are installed in the device and the surface microphone is positioned to overlie one or more facial bones of the user when in use.

13. The portable electronic communication device in accordance with claim 1, wherein the processor is further configured to perform speech and speaker identification on the acoustic signal and the surface vibration signal in parallel.

14. A method of authorizing a user to use a portable electronic device comprising:
sampling a user utterance from an authorized user through both an audio microphone and a surface microphone positioned on the authorized user's body to produce respective first and second signals;
generating a characterization of a difference between the first and second signals;
storing the generated characterization;
sampling a user utterance from a prospective user through both the audio microphone and the surface microphone, with the surface microphone being positioned on the prospective user's body to produce respective third and fourth signals; and
determining that the prospective user is the authorized user if the third and fourth signals are related by the stored characterization.

15. The method in accordance with claim 14, wherein generating the characterization of the difference between the first and second signals further comprises deriving a first transfer function linking the first and second signals.

16. The method in accordance with claim 15, wherein determining that the prospective user is the authorized user if the third and fourth signals are related by the stored characterization further comprises deriving a second transfer function linking the third and fourth signals and comparing the first and second transforms.

17. The method in accordance with claim 14, wherein generating the characterization of the difference between the first and second signals comprises deriving a transform linking the first and second signals, and wherein determining that the prospective user is the authorized user comprises transforming the third signal via the transfer function to produce a transformed third signal and comparing the transformed signal to the fourth signal.

* * * * *